Oct. 13, 1936.  B. F. PARR  2,057,501

SANDWICH GRILL

Filed April 24, 1934  2 Sheets-Sheet 1

WITNESSES:

INVENTOR
Bernard F. Parr
BY
ATTORNEY

Oct. 13, 1936.  B. F. PARR  2,057,501
SANDWICH GRILL
Filed April 24, 1934  2 Sheets-Sheet 2
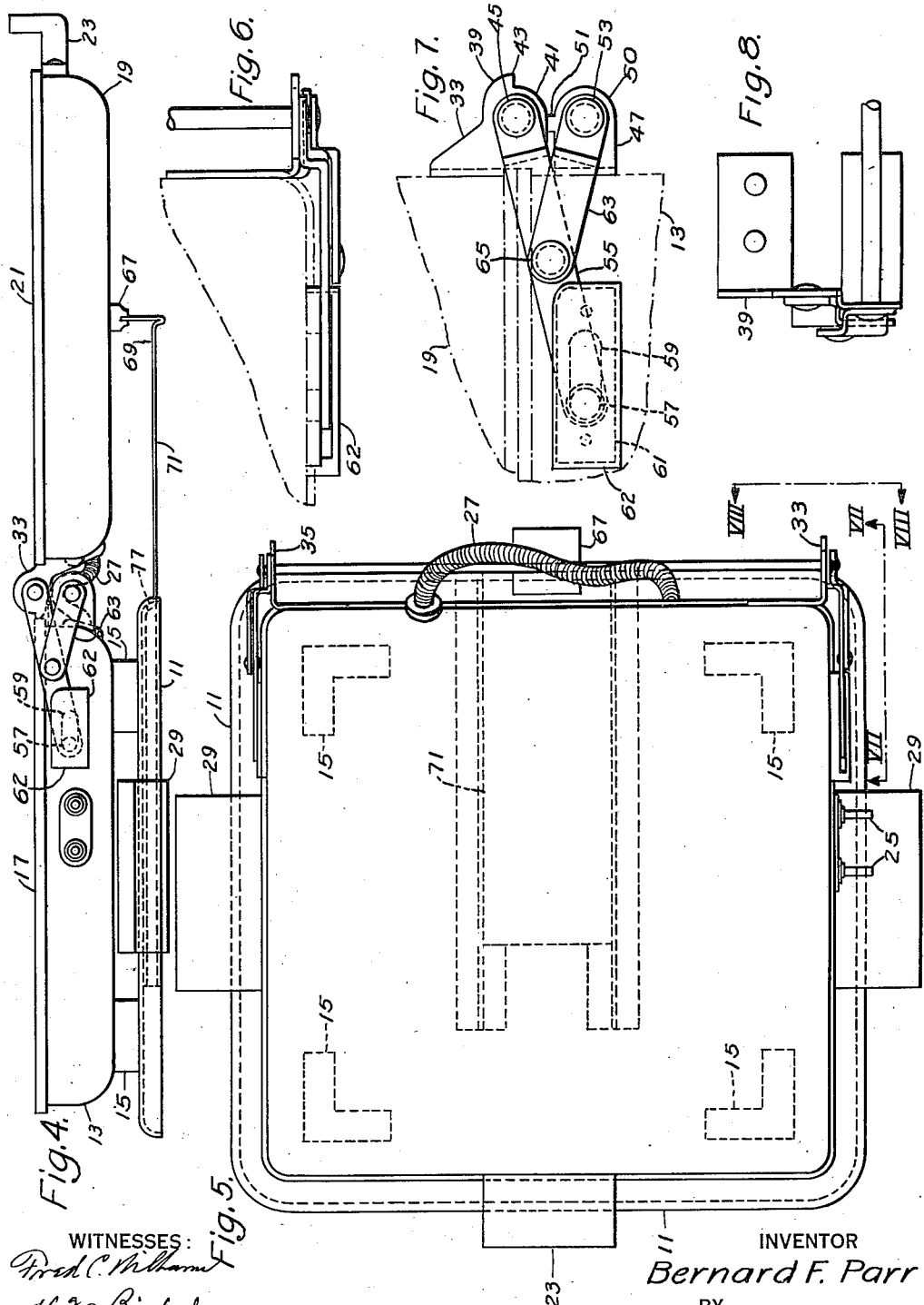
INVENTOR
Bernard F. Parr
BY
W. R. Coley
ATTORNEY Patented Oct. 13, 1936

2,057,501

UNITED STATES PATENT OFFICE 2,057,501

SANDWICH GRILL

Bernard F. Parr, Mansfield, Ohio, assignor to Westinghouse Electric & Manufacturing Company, East Pittsburgh, Pa., a corporation of Pennsylvania Application April 24, 1934, Serial No. 722,053

9 Claims. (Cl. 53—5)

My invention relates to electric cooking devices and particularly to sandwich grills and the like.

An object of my invention is to provide a relatively simple straight-line or parallel-motion hinge means for a sandwich grill or a waffle iron.

Another object of my invention is to provide a parallel-motion hinge device permitting of parallel-face movement of the two casings of a sandwich grill, for example, and also of relative angular movement of the two casings.

Another object of my invention is to provide a sandwich grill structure embodying a support for the upper casing, when turned to open position, adjacent to the lower casing and cooperating with the hinge means to locate the cooking surfaces in the two casings in substantially the same plane.

Other objects of my invention will either be apparent from the following description of one embodiment of my invention or will be hereinafter specifically pointed out.

In practicing my invention, I provide, in co-operation with the usual pair of cooperating casings and baking surfaces therein, a straight-line-motion linkage means or hinge structure including cooperating link arms and hinge brackets, the cooperating hinge brackets being so designed as to hold one of the casings in a predetermined angular position relatively to the other casing. The hinge structure permits of parallel-face movement of the casings to accommodate different thicknesses of sandwiches to be toasted, as well as permitting one casing to be turned angularly relatively to the other casing until the two cooking surfaces are substantially co-planar.

In the accompanying drawings:

Figure 1 is a view in side elevation of a sandwich grill embodying my invention, Fig. 2 is a view in rear elevation thereof, Fig. 3 is a view in side elevation, showing one casing located at substantially a right angle relatively to the other casing, Fig. 4 is a view in side elevation and on a slightly reduced scale showing the upper casing turned so as to be adjacent to the lower casing, the two cooking surfaces being substantially co-planar, Fig. 5 is a top plan view of the sandwich grill shown in Figs. 1 and 2.

Fig. 6 is a fragmentary top plan view showing particularly one hinge device,

Fig. 7 is a fragmentary view on a slightly enlarged scale of a hinge structure as viewed along the line VII—VII of Fig. 5 of the drawings, and Fig. 8 is a fragmentary rear view of a hinge structure taken along the line VIII—VIII of Fig. 5 of the drawings.

Figure 1:
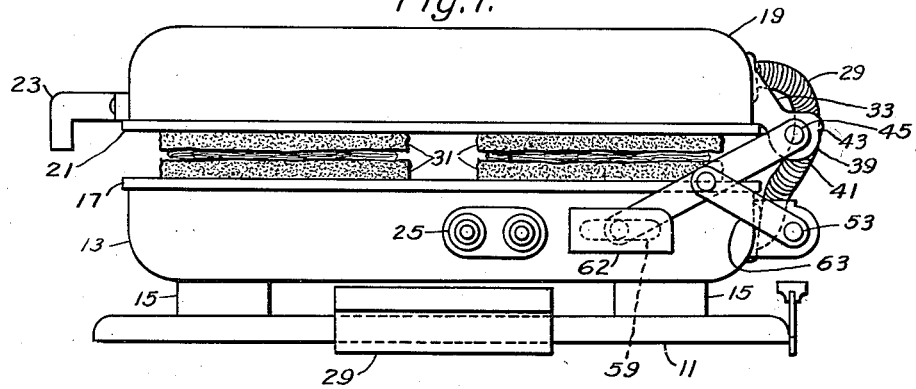

The illustrated sandwich grill includes a substantially flat hollow base 11 which may be of either circular or square shape in plan, but is here shown as being square in shape. A lower casing 13 is supported in spaced relation above the base 11 by blocks 15, which, as shown in Fig. 5 of the drawings, may be of substantially L-shape and which are preferably made of non-heat-conducting material. A lower cooking or baking surface or plate 17, which may be substantially plane on its operating surface, is associated with casing 13 and is held against the open side thereof, or secured to the four walls thereof, by any suitable means, not specifically indicated in the drawings.

An upper casing 19 has a second or upper baking surface or plate 21 associated therewith of substantially the same type as baking surface 17. The upper casing 19 has a lifting handle 23 secured thereto at the front portion thereof.

While no showing is made in the drawings of electric heating elements, it is to be understood that such heating elements are provided and that they may be of any suitable or desired type and construction already known in the art, no showing thereof being made for the reason that such elements do not constitute a part of my present invention. Energization of these heating elements is effected by means of the usual connecting plug which may be operatively associated with a pair of contact pins 25, and means for connecting the heating elements in the lower and in the upper casing are shown as extending through a flexible armored conduit 27 in a manner well known in the art.

The hollow base 11 may be provided with a pair of lifting handles 29, one at each side of the assembly.

One of the conditions to be met with in the toasting of sandwiches or in the baking of waffles is that the two baking surfaces shall have parallel-face movement relatively to each other, that is, that the two baking surfaces in their entirety shall be adapted to be located different distances from each other in order to take different thicknesses of sandwiches such as shown at 31 in Fig. 1 of the drawings, or to permit of an increase in the thickness of a waffle occurring during the baking operation.

Figure 2:
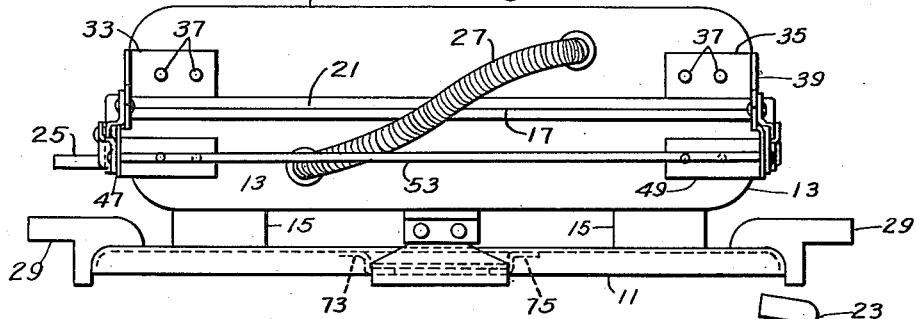

In order to permit of this parallel-face motion, I provide special means cooperating with the hinges of the sandwich grill or waffle iron. The upper casing 19 is provided with two hinge brackets 33 and 35, one being located at each of the rear corners thereof, these brackets being of substantially L-shape, one arm portion thereof being secured against the rear wall of casing 19 by a plurality of rivets 37 shown particularly in Fig. 2 of the drawings. The other arm portion, designated by numeral 39, extends slightly downwardly and has a rounded lower surface indicated at 41 in Figs. 1 and 7 of the drawings, and also a projection or lug 43 shown plainly in Fig. 7 of the drawings. The other hinge bracket 33 is provided with a similar angularly depending arm, curved surface, and projection as explained for hinge bracket 35. It is to be noted that the arm or portion 39 is to receive a pivot pin 45 and the center of this pivot pin is preferably located by me in the same plane as that in which the two opposing faces of the baking surfaces normally contact or engage with each other.

The lower casing 13 is provided with substantially similar hinge brackets 47 and 49, each of substantially L-shape and the rearwardly extending arm 49 of each hinge bracket is provided with a laterally extending short lug 51 for a purpose to be hereinafter described. In order to insure that the two hinges will operate in unison I may provide a rod 53 extending through suitable openings in portions 50 of hinge brackets 47 and 49 and acting as a pivot pin.

Parallel-motion means operatively connecting the hinge brackets and one of the casings include a first relatively long link arm 55 which has its upper end pivotally engaging the pin or rivet 45 in the hinge bracket in the upper casing, while the other lower end thereof is provided with a short headed stud 57 which may slide horizontally in a slot 59 provided in a short bar 61 which is secured to the side of lower casing 13. The slidable stud 57 is held in its proper operative position by a suitable cover plate 62. The parallel-motion device includes further a second shorter link arm 63 having its lower end pivotally mounted on rod or shaft 53 while its upper end is pivotally secured to a pin or stud 65 secured to the first link arm 55 intermediate its ends. I wish to here point out that the length of link arm 63 is preferably made exactly one-half that of link arm 55 and that the pin 65 is located mid way between the pins 45 and 57 whereby the hinge pin 45 will move in a straight line upwardly or downwardly. It is to be understood that one of these straight line motion linkage devices is provided for each side of the two casings. As will be seen more particularly from Figs. 5, 6 and 8, the two link arms 55 and 63 are bent inwardly adjacent to their rear end portions in order that the rear ends thereof may be properly located with regard to the hinge brackets hereinbefore described.

A hinge construction as just described and embodying the two interconnected link arms will permit of raising one of the casings, in this instance the upper casing, through a certain distance above the lower casing so that different thicknesses of food to be cooked can be accommodated between the two baking surfaces 17 and 21, while these surfaces remain in parallel spaced relation relatively to each other. It will be seen that my above-described plural interconnected linkage means restrains movement of the baking surfaces to different distances apart in such parallel-spaced relation to a single straight line extending at substantially right angles to said surfaces. A structure of this kind will also permit of the two baking surfaces being located at a small angle relatively to each other while spaced apart instead of being parallel to each other.

Figure 3:
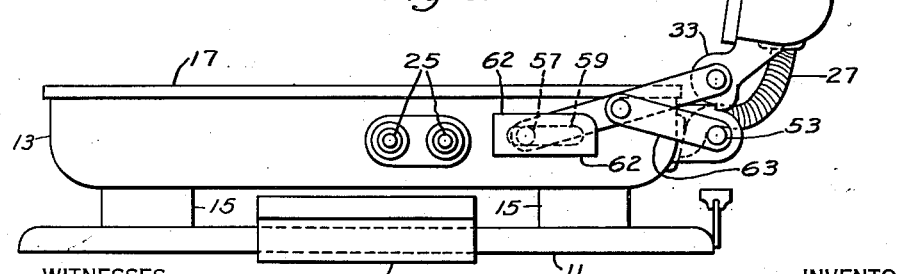

It may be desirable, during the normal operation of a device of this kind, to open it or to move the upper casing and the associated baking surface into the positions shown more particularly in Fig. 3 of the drawings when they will extend at substantially a right angle to the stationary part of the assembly. The lugs or noses 43 on the two upper hinge brackets 33 and 35 will then engage the lugs 51 on the lower hinge brackets 47 and 49, whereby further relative angular movement of the upper casing will be prevented and the upper casing and the associated parts will be held in stable equilibrium. It is, of course, preferable to hold the upper casing and baking surface at an angle slightly greater than 90° away from the lower casing and baking surface in order to preclude undesired return of the upper casing and the parts associated therewith.

Fig. 4 of the drawings shows the relative positions of the lower and of the upper casing when they are so located that the faces of the baking surfaces are substantially co-planar as may be the case for certain cooking operations or where it is desired to maintain food warm without further cooking thereof. It is obvious that an operator may move the upper casing from the position shown in Fig. 3 of the drawings to the position shown in Fig. 4 of the drawings by first lifting the upper casing 19 upwardly by the handle 23 which is shown as being made of substantially L-shape, for this purpose, until lugs 43 are disengaged from lugs 51, after which the upper casing may be moved to the position shown in Fig. 4 of the drawings. Under such conditions it is desirable to provide some means for supporting the upper casing above a table or other horizontal surface on which the sandwich grill may be placed and for this purpose, I provide a support 67 made of heat insulating material upon which the outer surface of casing 13 may rest. Member 67 is secured at the upper end of a short arm 69 constituting a part of a metal strip or bar 71 which is normally located within the hollow base 11. For this purpose, two glides 73 and 75, each of substantially Z-shape, are secured in the position shown more particularly in Fig. 2 of the drawings, against the under surface of the hollow base 11 to provide a track for member 71. In order to prevent member 71 and the associated parts from being unintentionally removed from the base, the inner end of member 71 may be bent slightly upwardly, as is shown more particularly in Fig. 4 of the drawings, to prevent complete withdrawal of the support from the base. If the operator wishes to open the grill or waffle iron entirely to the position shown in Fig. 4 of the drawings, he will pull out the support 67 to the full extent of travel permitted by member 71 after which the upper casing 19 may be located thereon substantially as shown in Fig. 4 of the drawings.

The device embodying my invention thus provides a relatively simple straight line or parallel-motion linkage or hinge means comprising link arms pivotally associated with the hinge brackets and with each other and slidably-pivotally associated with one of the casings, to permit of accommodating different thicknesses of sandwiches between the cooperating baking surfaces, as well as to hold the upper casing in a predetermined angular position relatively to the lower casing, and further to permit of complete opening angular movement of the upper casing to the position shown in Fig. 4 of the drawings.

While I have illustrated and described my invention as applied more particularly to a grill of substantially square shape, it is obvious that I am not limited to such shape but that it may be readily applied to any kind of sandwich grill, waffle iron or the like.

Various modifications may be made in the device embodying my invention without departing from the spirit and scope thereof, and I desire therefore that only such limitations shall be placed thereon as are imposed by the prior art or as set forth in the appended claims.

I claim as my invention:

1. In an appliance including two members adapted to occupy different positions relatively to each other, plural interconnected linkage means operatively connecting the two members to effect location of said members in parallel-spaced positions different distances apart along a straight line only and to move one member pivotally relatively to the other.

2. In a cooking appliance including two casings adapted to occupy different positions relatively to each other, plural interconnected linkage means pivotally connecting the two casings to permit of moving said casings apart in parallel-faced relation along a line substantially at right angles to their faces only and of turning one casing pivotally relatively to the other.

3. In a device including two members adapted to occupy different positions relatively to each other, a link arm pivotally connected to one member and pivotally and slidably connected to the other member, and a second link having one end pivotally connected to said other member and having its other end pivotally connected to the first-named link arm intermediate its ends.

4. In a sandwich grill or the like comprising an upper and a lower casing, hinge means connecting the casings to permit of parallel-face movement and of relative turning movement thereof, said hinge means including a hinge bracket on each casing, a link pivotally connected to the bracket on the upper casing and slidably and pivotally connected to the lower casing and a second link pivotally connected to the bracket on the lower casing and to the first-named link intermediate its ends.

5. In a sandwich grill or the like comprising an upper and a lower casing, cooking surfaces in each casing, hinge means connecting the casings and including hinge brackets secured to each of the casings and plural interconnected linkage means connected to the brackets pivotally only and slidably connected to one of said casings to effect parallel-spaced positions of the two cooking surfaces and casings and different spaced angular positions thereof relatively to each other, said linkage means preventing separation of said cooking surfaces into such parallel-spaced positions except along a single straight line.

6. In a sandwich grill or the like comprising two cooperating cooking surfaces and casings therefor, hinge means operatively connecting said casings, said means including hinge brackets secured to the respective casings, a link arm of a certain length having one end thereof pivotally connected to one hinge bracket and having its other end pivotally and slidably connected to the other casing, and a second link of half the length of the first link arm having one end pivotally connected to a second hinge bracket and its other end pivotally connected to the first link arm at its mid-point.

7. In a sandwich grill or the like comprising two cooperating cooking surfaces and casings therefor, hinge means including hinge brackets on the respective casings and linkage means connected pivotally only to the respective brackets and slidably connected to one of said casings to effect parallel-spaced location of the cooking surfaces at different distances apart, and cooperating means on the respective hinge brackets cooperating with the linkage means to hold one casing and cooking surface in a predetermined angular position relatively to the other casing and cooking surface, said linkage means being effective to restrain movements of said cooking surfaces to said different distances to a single straight line.

8. In a sandwich grill or the like comprising a base, two cooperating cooking surfaces and upper and lower casings therefor on the base, hinge means on the casings to hold the cooking surfaces different distances apart in parallel-face positions, to hold the upper casing at substantially a right angle position relatively to the lower casing, and to permit the upper casing to be located in an inverted position adjacent to the lower casing, and means extending from the base to support the upper casing so that the cooking surface thereon will be substantially coplanar with the cooking surface in the lower casing.

9. In a sandwich grill or the like comprising a hollow base, a lower casing on the base, a cooking surface in the lower casing, an upper casing, a cooking surface in the upper casing, hinge means connecting the two casings to effect relative angular movement of the two casings, and means including the hinge means and a support extending from the hollow base to engage the upper casing for supporting the upper casing adjacent the lower casing with the two cooking surfaces substantially coplanar.

BERNARD F. PARR.